United States Patent
Rokunohe et al.

[11] Patent Number: 5,689,088
[45] Date of Patent: Nov. 18, 1997

[54] GAS INSULATED DEVICE, GAS INSULATED SWITCHGEAR, GAS INSULATED BUS LINE, AND CABLE DIRECT-COUPLED GAS INSULATED SWITCHGEAR

[75] Inventors: Toshiaki Rokunohe; Fumihiro Endo; Tokio Yamagiwa; Kenji Anno, all of Hitachi, Japan

[73] Assignee: Hitachi, Ltd., Tokyo, Japan

[21] Appl. No.: 575,157

[22] Filed: Dec. 19, 1995

[30] Foreign Application Priority Data

Dec. 22, 1994  [JP]  Japan .................. 6-319951

[51] Int. Cl.⁶ .................. H01B 9/06; H02G 15/24
[52] U.S. Cl. .................. 174/21 C; 174/24; 174/28
[58] Field of Search .................. 174/14 R, 16.2, 174/17 GF, 21 C, 22 C, 24, 28, 68.2, 99 B, 21 R; 361/604, 605, 611, 612

[56] References Cited

U.S. PATENT DOCUMENTS

| | | | |
|---|---|---|---|
| 3,546,356 | 12/1970 | Graybill | 174/21 R |
| 3,809,795 | 5/1974 | Olsen et al. | 174/28 |
| 4,316,052 | 2/1982 | Matsuda | 174/14 R |
| 4,366,340 | 12/1982 | Trinh | 174/28 |
| 4,370,511 | 1/1983 | Cookson et al. | 174/14 R |
| 4,550,219 | 10/1985 | Bolin et al. | 174/21 C |
| 4,556,755 | 12/1985 | Bolin et al. | 174/21 C |
| 4,570,202 | 2/1986 | Nishida et al. | 361/333 X |
| 4,730,085 | 3/1988 | Hama et al. | 174/14 R |
| 5,177,664 | 1/1993 | Tschiya et al. | 361/341 X |

FOREIGN PATENT DOCUMENTS

| | | |
|---|---|---|
| 3109669A1 | 11/1982 | Germany . |
| 57-192717 | 12/1982 | Japan . |
| 63-59711 | 3/1988 | Japan . |
| 64-1411 | 1/1989 | Japan . |
| 6-105424 | 4/1994 | Japan . |
| 6-153342 | 5/1994 | Japan . |
| 6-269109 | 9/1994 | Japan . |

*Primary Examiner*—Kristine L. Kincaid
*Assistant Examiner*—Chau Ngoc Nguyen
*Attorney, Agent, or Firm*—Fay, Sharpe, Beall Fagan, Minnich & McKee

[57] ABSTRACT

A gas insulated device includes a grounded tank filled with an insulating gas and having a conical insulator spacer securely mounted therein to define an interior space. A through-type electric connector extends through and is supported by the insulated spacer and an electric conductor is electrically connected to the through-type electric conductor by a conductor connector. The conductor connector closest to the insulator spacer is positioned such that electric flux lines exiting from the conductor connector intersect with the surface of the insulator spacer in a region in which an electric field has a strength equal to or less than 70% of the strength of the strongest electric field on the surface of the insulator spacer generated by a lightning impulse applied to the gas insulated device.

12 Claims, 7 Drawing Sheets

5,689,088

GAS INSULATED DEVICE, GAS INSULATED SWITCHGEAR, GAS INSULATED BUS LINE, AND CABLE DIRECT-COUPLED GAS INSULATED SWITCHGEAR

BACKGROUND OF THE INVENTION

1. Field of the Invention

The present invention relates generally to gas insulated devices, and more particularly to a gas insulated device, gas insulated switchgear, gas insulated bus line, and cable direct-coupled gas insulated switchgear which have a structure for preventing the insulation characteristics from being deteriorated due to a lightning impulse applied thereto after a switching impulse or a direct-current voltage has been applied.

2. Description of the Related Art

A conventional gas insulated device is structured such that an electric conductor is supported in an insulated state by insulator spacers arranged in grounded tanks filled with an insulating gas such as $SF_6$. Such a structure is disclosed, for example, in JU-A-57-192717. FIG. 1 of JU-A-57-192717 shows insulator spacers 8, 9, each of which holds a through-type electric conductor extending therethrough. A cylindrical electric conductor is inserted into the through-type electric conductor to form a conductor connector by which the through-type electric conductor is supported. An electric conductor 2 is also connected at both ends thereof to the cylindrical electric conductors through electric conductor connectors covered with shields 5, 6, respectively.

It is known that the gas insulated device of the type mentioned above suffers from deteriorated insulation breakdown performance when the surfaces of the insulator spacers are electrified. This deterioration in the insulation breakdown performance is caused particularly by the influence of electrons emitted from the conductor connectors positioned closest to the insulator spacers. It should be noted that in FIG. 1 of JU-A-57-192717, the conductor connectors having the shields for supporting both ends of the electric conductor 2 are spaced from the insulator spacers 8, 9, so that the conductor connectors do not contribute to deterioration in the insulation performance of the insulator spacers.

To solve the problem of the deterioration in the insulation breakdown performance, JP-A-64-1411 discloses a gas insulated device including cylindrical spacers which are given a shape conforming to electric flux lines, as depicted in FIGS. 8, 9 of JP-A-64-1411, to reduce electric charges impinging on the surfaces of the insulator spacers to suppress the electrification, thus preventing the deterioration in the insulation performance due to a switching impulse applied to the gas insulated device after a direct current has been applied.

SUMMARY OF THE INVENTION

Although the above-mentioned prior art examples have achieved improvements in the insulation performance of the cylindrical spacers, they do not consider deterioration in the insulation performance of conical or disk-like spacers. This is because such conical or disk-like spacers cannot be made in a shape conforming to electric flux lines. Thus, spacers having such shapes are susceptible to the electrification on the surfaces thereof, possibly caused by a switching impulse or a direct-current voltage applied to the gas insulated device, whereby the breakdown voltage is lowered against a lightning impulse which may be subsequently applied.

It is an object of the present invention to provide a gas insulated device which is free from a deteriorated insulation performance when a lightning impulse is subsequently applied thereto, even if the surfaces of insulator spacers are electrified due to a switching impulse or a direct-current voltage applied thereto.

It is another object of the present invention to provide a gas insulated switchgear which is free from a deteriorated insulation performance even after a circuit-breaker or a disconnector has operated.

It is a further object of the present invention to provide a gas insulated bus line which is free from a deteriorated insulation performance even after a switching impulse or a direct current voltage has been applied thereto.

It is a further object of the present invention to provide a cable direct-coupled gas insulated switchgear which is free from a deteriorated insulation performance even after a disconnector has operated.

To achieve the above objects, according to one aspect, the present invention provides a gas insulated device comprising a grounded tank filled with an insulating gas, a conical insulator spacer securely mounted in the grounded tank and defining an interior space of the grounded tank, a through-type electric conductor extending through and supported by the insulator spacer, an electric conductor electrically connected to the through-type electric conductor, a conductor connector for electrically connecting the electric conductor with the through-type electric conductor and for supporting the electric conductor. The conductor connector closest to the insulator spacer is positioned such that electric flux lines exiting from the conductor connector intersect with the surface of the insulator spacer in a region in which an electric field has a strength equal to or less than 70% of the strength of the strongest electric field on the surface of the insulator spacer generated by a lightning impulse applied to the gas insulated device, whereby the gas insulated device is free from a deteriorated insulation performance, without suffering from the electrification due to a switching impulse or a direct-current voltage, so that insulation breakdown will not occur even if a lightning impulse is applied after the switching impulse or a direct-current voltage has been applied.

The present invention also provides a gas insulated device comprising a grounded tank filled with an insulating gas, a conical insulator spacer securely mounted in the grounded tank and defining an interior space of the grounded tank, a through-type electric conductor extending through and supported by the insulator spacer, an electric conductor electrically connected to the through-type electric conductor, a conductor connector for electrically connecting the electric conductor with the through-type electric conductor and for supporting the electric conductor, and an electrode embedded in a flange of the insulator spacer. The conductor connector closest to the insulator spacer is positioned such that a perpendicular line drawn coincidental with an end of the conductor connector facing a concave surface of the insulator spacer through a central axis of the electric conductor does not approach the concave surface of the insulator spacer beyond the embedded electrode in the flange of the insulator spacer, whereby the gas insulated device is free from a deteriorated insulation performance, without suffering from the electrification due to a switching impulse or a direct-current voltage, so that insulation breakdown will not occur even if a lightning impulse is applied after the switching impulse or a direct-current voltage has been applied.

The present invention further provides a gas insulated device comprising a grounded tank filled with an insulating gas, a conical insulator spacer securely mounted in the grounded tank and defining an interior space of the grounded tank, a through-type electric conductor extending through and supported by the insulator spacer, an electric conductor electrically connected to the through-type electric conductor, and a conductor connector for electrically connecting the electric conductor with the through-type electric conductor and for supporting the electric conductor. A surface treatment is performed on a portion of a surface of the electric conductor and/or the conductor connector from which electric flux lines exit and intersect with the surfaces of the insulator spacer in a region in which an electric field has a strength equal to or more than 70% of the strength of the strongest electric field on the surface of the insulator spacer generated by a lightning impulse applied to the associated gas insulated device, whereby the gas insulated device is free from a deteriorated insulation performance, without suffering from the electrification due to a switching impulse or a direct-current voltage, so that insulation breakdown will not occur even if a lightning impulse is applied after the switching impulse or a direct-current voltage has been applied.

According to another aspect, the present invention provides a gas insulated switchgear comprising a circuit-breaker, a disconnector, and a gas insulated device for connecting the circuit-breaker with the disconnector, the gas insulated device including a grounded tank filled with an insulating gas, a conical insulator spacer securely mounted in the grounded tank and defining an interior space of the grounded tank, a through-type electric conductor extending through and supported by the insulator spacer, an electric conductor electrically connected to the through-type electric conductor, and a conductor connector for electrically connecting the electric conductor with the through-type electric conductor and for supporting the electric conductor. The conductor connector closest to the insulator spacer is positioned such that electric flux lines exiting from the conductor connector intersect with the surface of the insulator spacer in a region in which an electric field has a strength equal to or less than 70% of the strength of the strongest electric field on the surface of the insulator spacer generated by a lightning impulse applied to the associated gas insulated device, whereby the gas insulated switchgear is free from a deteriorated insulation performance, without suffering from the influence of the electrification, even after the disconnector or the circuit-breaker has operated.

The present invention also provides a gas insulated switchgear comprising a circuit-breaker, a disconnector, and a gas insulated device for connecting the circuit-breaker with the disconnector, the gas insulated device including a grounded tank filled with an insulating gas, a conical insulator spacer securely mounted in the grounded tank and defining an interior space of the grounded tank, a through-type electric conductor extending through and supported by the insulator spacer, an electric conductor electrically connected to the through-type electric conductor, a conductor connector for electrically connecting the electric conductor with the through-type electric conductor and for supporting the electric conductor, and an embedded electrode embedded in a flange of the insulator spacer. The conductor connector closest to the insulator spacer is positioned such that a perpendicular line drawn coincidental with an end of the conductor connector facing a concave surface of the insulator spacer through a central axis of the electric conductor does not approach the concave surface of the insulator spacer beyond the embedded electrode in the flange of the insulator spacer, whereby the gas insulated switchgear is free from a deteriorated insulation performance, without suffering from the influence of the electrification, even after the disconnector or the circuit-breaker has operated.

The present invention further provides a gas insulated switchgear comprising a circuit-breaker, a disconnector, and a gas insulated device for connecting the circuit-breaker with the disconnector, the gas insulated device including a grounded tank filled with an insulating gas, a conical insulator spacer securely mounted in the grounded tank and defining an interior space of the grounded tank, a through-type electric conductor extending through and supported by the insulator spacer, an electric conductor electrically connected to the through-type electric conductor, and a conductor connector for electrically connecting the electric conductor with the through-type electric conductor and for supporting the electric conductor. A surface treatment is performed on a portion of a surface of the electric conductor and/or the conductor connector from which electric flux lines exit and intersect with the surface of the insulator spacer in a region in which an electric field has a strength equal to or more than 70% of the strength of the strongest electric field on the surface of the insulator spacer generated by a lightning impulse applied to the associated gas insulated device, whereby the gas insulated switchgear is free from a deteriorated insulation performance, without suffering from the influence of the electrification, even after the disconnector or the circuit-breaker has operated.

According to a further aspect, the present invention provides a gas insulated bus line comprising a grounded tank filled with an insulating gas, a conical insulator spacer securely mounted in the grounded tank and defining an interior space of the grounded tank, and a through-type electric conductor extending through and supported by the insulator spacer. A surface treatment is performed on a portion of a surface of the through-type electric conductor and/or the conductor connector from which electric flux lines exit and intersect with the surface of the insulator spacer in a region in which an electric field has a strength equal to or more than 70% of the strength of the strongest electric field on the surface of the insulator spacer generated by a lightning impulse applied to the associated gas insulated device, whereby the gas insulated bus line is free from a deteriorated insulation performance, without suffering from the electrification due to a switching impulse or a direct-current voltage, so that insulation breakdown will not occur even if a lightning impulse is applied after the switching impulse or a direct-current voltage has been applied.

According to a yet further aspect, the present invention provides a cable direct-coupled gas insulated switchgear comprising a cable, a disconnector, and a gas insulated device for connecting the cable with the disconnector, the gas insulated device including a grounded tank filled with an insulating gas, a conical insulator spacer securely mounted in the grounded tank and defining an interior space of the grounded tank, a through-type electric conductor extending through and supported by the insulator spacer, an electric conductor electrically connected to the through-type electric conductor, and a conductor connector for electrically connecting the electric conductor with the through-type electric conductor and for supporting the electric conductor. A surface treatment is performed on a portion of a surface of the electric conductor and/or the conductor connector from which electric flux lines exit and intersect with the surface of the insulator spacer in a region in which an electric field has a strength equal to or more than 70% of the strength of the strongest electric field on the surface of the insulator spacer generated by a lightning impulse applied to the associated gas insulated device, whereby the cable direct-coupled gas insulated switchgear is free from a deteriorated insulation performance, without suffering from the influence of the electrification, even after the disconnector or the circuit-breaker has operated.

The present invention also provides a gas insulated device comprising a plurality of grounded tanks, each filled with an insulating gas, a conical insulator spacer securely mounted in the grounded tank and defining an interior space of the grounded tank, an electric conductor extending through and supported by the insulator spacer, and a shield member for covering part of the outer peripheral surface of the electric conductor. The shield member closest to the insulator spacer is positioned such that electric flux lines exiting from the shield member intersect with the surface of the insulator spacer in a region in which an electric field has a strength equal to or less than 70% of the strength of the strongest electric field on the surface of the insulator spacer generated by a lightning impulse applied to the associated gas insulated device, whereby the gas insulated device is free from a deteriorated insulation performance, without suffering from the influence of the electrification, even after a disconnector or a circuit-breaker has operated.

DESCRIPTION OF THE PREFERRED EMBODIMENTS

The present invention will hereinafter be described in connection with several embodiments thereof with reference to the accompanying drawings.

However, prior to describing specific embodiments, the principles of the present invention will be explained with reference to FIGS. 3A, 3B.

Figure 1:
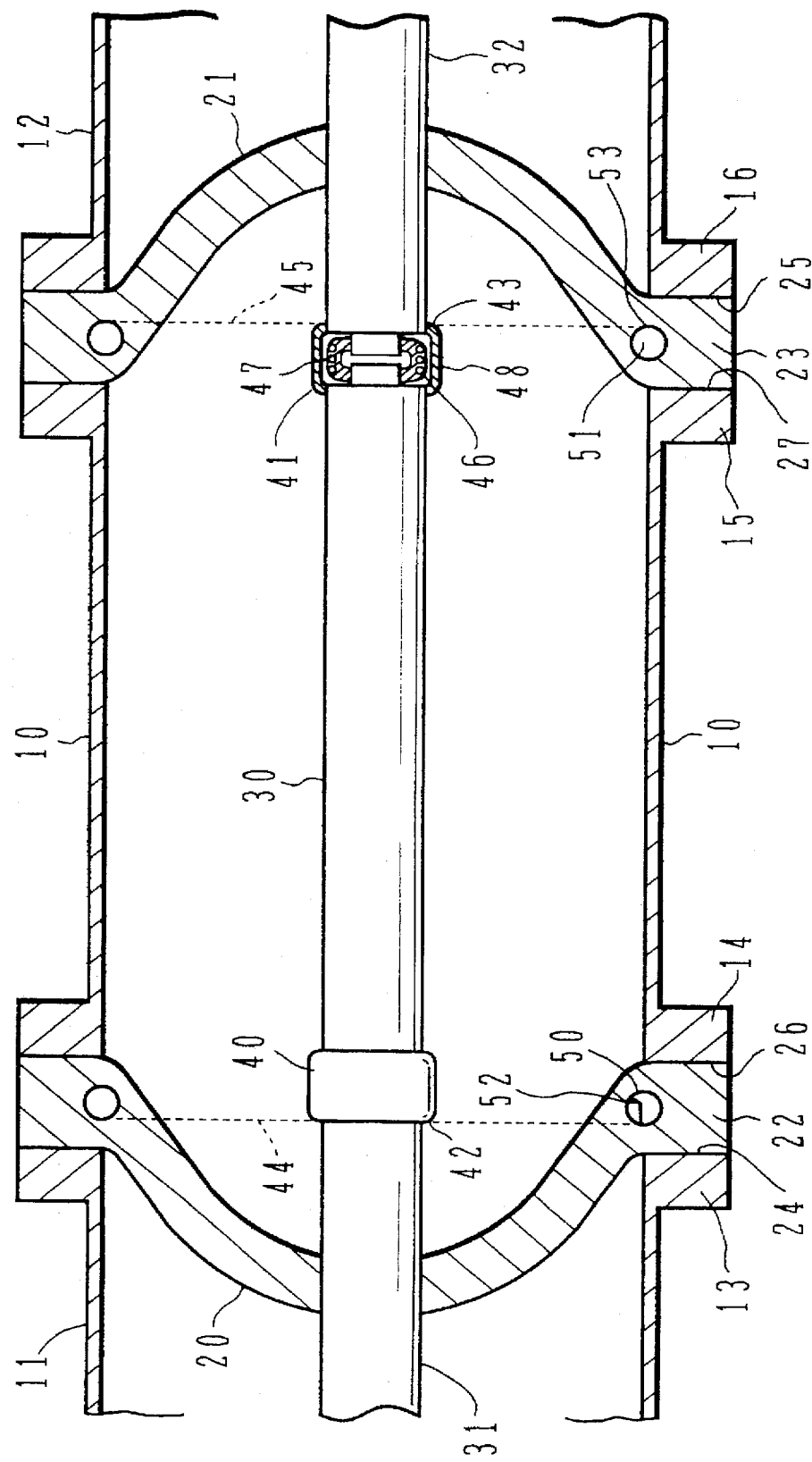
FIG. 1 is a cross-sectional view of a gas insulated device according to one embodiment of the present invention.
Figure 3A:
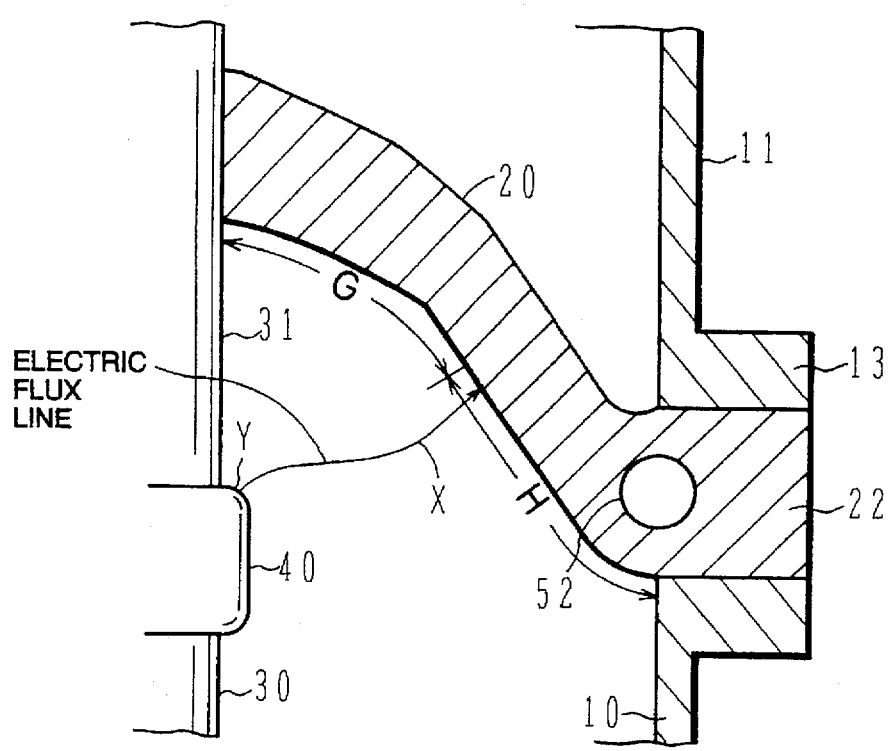
FIG. 3A is an enlarged cross-sectional view showing in detail a portion of the gas insulated device of FIG. 1.
Figure 3B:
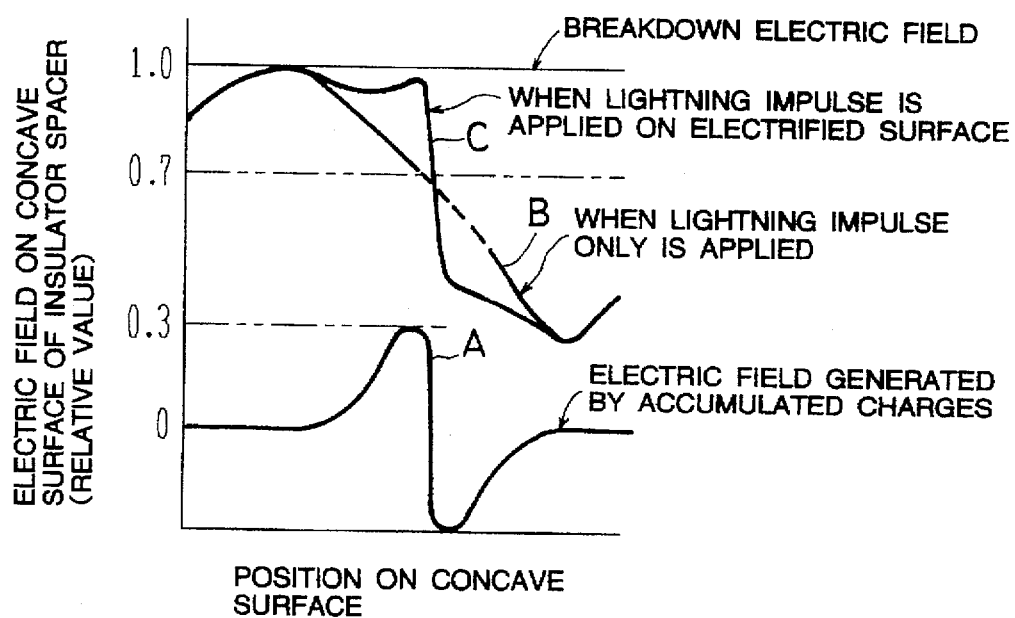
FIG. 3B is a graph representing an electric field generated on an electrified insulator spacer.

FIG. 3A shows an enlarged view of a main portion, particularly related to the present invention, of a gas insulated device which is generally illustrated in FIG. 1. FIG. 3B is a graph showing a distribution of an electric field on a concave surface of an insulator spacer 20, with the ordinate axis representing the electric field on the surface and the abscissa axis representing the position on the concave surface in the radial direction from the center to the outer periphery of the insulator spacer 20.

Referring specifically to FIG. 3A, a through-type electric conductor 31 is held in the center of the insulator spacer 20, and an electric conductor 30 is connected to the through-type electric conductor 31 via a conductor connector 40. A flange 22 of the insulator spacer 20 is fastened between a flange 14 of a grounded tank 10 and a flange 13 of a grounded tank 11. An embedded electrode 52 is arranged in the flange 22 of the insulator spacer 22.

When an insulation breakdown voltage is taken into account for a gas insulated device, the problem to be most considered is a lightning impulse. This is because the lightning impulse has a far steeper and higher peak value than a switching impulse or the like. Even if a gas insulated device is designed to have a sufficient insulation breakdown performance for a predetermined voltage of lightning impulses, actually, an electric field generated by charges accumulated on the surface of the insulator spacer is superimposed on an electric field generated when the lightning impulse is applied. Consequently, the insulation breakdown is caused by a lightning impulse having a voltage lower than an original design value for lightning impulses which the gas insulated device is expected to tolerate.

The surface of the insulator spacer is electrified, for example, due to the application of a switching impulse to the gas insulated device. More specifically, the application of a negative switching impulse causes electrons to be emitted from the electric conductor to a surrounding electric field. The electrons or charges produced by the electrons are accumulated on the surface of the insulator spacer to result in the electrification thereon. A voltage of a lightning impulse causing breakdown, when the surface of the insulator spacer is electrified, becomes lower than a breakdown voltage when a lightning impulse only is applied, i.e., the surface of the insulator spacer is not electrified. The accumulated charges are gradually increased as the switching impulse is repetitively applied.

When the electric conductor is electrically disconnected by a disconnector or a circuit-breaker, even a direct-current voltage applied to the electric conductor may cause electrification on the surface of an insulator spacer in an area where a direct current voltage remains. A voltage of a lightning impulse causing breakdown, when the surface of the insulator spacer is electrified due to the direct-current voltage, becomes lower than a breakdown voltage when a lightning impulse only is applied, i.e., the surface of the insulator spacer is not electrified. The accumulated charges are gradually increased as the direct-current voltage is repetitively applied.

The insulation breakdown voltage of the insulator spacer largely depends on the electric field on the surface thereof. Specifically, at the location presenting the strongest electric field, the insulator spacer is subjected to the largest insulation breaking action. Thus, the insulation breakdown voltage of the insulator spacer is substantially determined by the strongest electric field on the surface thereof. As a result of an investigation on the electric field generated by charges accumulated on the surface of the insulator spacer, it has been found that the electric field has a saturated value which reaches approximately 30% of a breakdown electric field generated by the application of only a lightning impulse. Stated another way, at the location presenting the strongest electric field on the surface of the insulator spacer, an electric field corresponding to 30% of the breakdown electric field is formed by the accumulated charges. Therefore, this electric field due to the accumulated charges is added to the electric field generated when a lightning impulse is applied, whereby the insulation breakdown voltage is correspondingly lowered.

In the present invention, the location on the surface of the insulator spacer presenting the strongest electric field generated by accumulated charges was taken into account, and the relationship between the electric field generated by the accumulated charges and an electric field generated by a lightning impulse applied to the gas insulated device was defined on this particular location.

Referring again to FIG. 3B, a solid line A represents an electric field generated by accumulated charges caused by a switching impulse applied to the gas insulated device (FIG. 1). Specifically, the charges accumulated on the surface of the insulator spacer 20 are distributed such that positive and negative peak values appear respectively on right and left sides of a point at which an electric flux line X (represented by a single solid line X with an arrow at its head in FIG. 3A) exiting from a conductor connector intersects with a concave surface of the insulator spacer 20. This is because electrons emitted from the electric conductor due to an applied switching impulse as well as charges travel along the electric flux line X and reach the surface of the insulator spacer 20, so that the largest amount of charges are accumulated at the intersection of the electric flux line X and the insulator spacer 20.

From an end portion Y of the conductor connector 40 (see FIG. 3A), i.e., from corners of the conductor connector 40, electrons are most likely to exit. If the end portion Y of the conductor connector 40 is spaced from the insulator spacer 20, electrons emitted therefrom direct to the grounded tank 10, so that no problem will occur in terms of the electrification of the insulator spacer 20. However, as the conductor connector 40 is located closer to the insulator spacer 20, the emitted electrons more largely contributes to the electrification of the insulator spacer 20. In FIG. 3B, a line B partially including a broken line portion represents a distribution of charges accumulated on the surface of the insulator spacer 20 when a lightning impulse voltage only is applied. This charge distribution depends on the shape of the insulator spacer 20. Therefore, if a lightning impulse is applied to the gas insulated device after a switching impulse has been applied to the same, the charges accumulated on the concave surface of the insulator spacer 20 are distributed as indicated by a solid line C which represents the sum of the line A and the line B. It will be understood here that the insulation breakdown does not occur if the value of the electric field at the positive peak point on the concave surface of the insulator spacer, which represents the sum of the positive peak electric field generated by the accumulated charges and the electric field generated by the lightning impulse, does not exceed 1.0.

From the foregoing discussion, it is found that if the portion on the surface of the insulator spacer 20 electrified by the switching impulse is in a region in which an electric field, generated when a lightning impulse is applied, has a strength equal to or less than 70% of the strength of the strongest electric field on the surface of the insulator spacer 20 generated by the lightning impulse, it is possible to prevent the breakdown caused by the application of the lightning impulse after the switching impulse has been applied. This is because the highest value of the combined electric field in that portion on the surface of the insulator spacer 20 generated by the switching impulse and the subsequent lightning impulse is equal to the highest value of the electric field on the surface of the insulator spacer 20 generated only by the lightning impulse.

While the above description has been made on the influence of accumulated charges generated by a switching impulse applied to the gas insulated device, the charge accumulation is similarly caused when a direct-current voltage is applied to the gas insulated device. More specifically, when a direct-current voltage is applied to the electric conductor of the gas insulated device, a larger amount of charges are accumulated on the surface of the insulator spacer as the applied direct-current voltage becomes higher. In this way, charges are accumulated on the surface of the insulator spacer. An investigation on an electric field generated by the charges accumulated on the surface of the insulator spacer due to an applied direct-current voltage has revealed that the electric field has a saturated value which reaches approximately 30% of a breakdown electric field generated only by the application of a lightning impulse. Stated another way, at the location presenting the strongest electric field on the surface of the insulator spacer, an electric field corresponding to 30% of the breakdown electric field is formed by the accumulated charges. Therefore, this electric field due to the accumulated charges is added to the electric field generated when a lightning impulse is applied, whereby the insulation breakdown voltage is correspondingly lowered.

Therefore, the present invention defines the position of the conductor connector such that electric flux lines exiting therefrom intersect with a region on the surface of the insulator spacer in which an electric field has a strength equal to or less than 70% of the strength of the strongest electric field generated on the surface of the insulator spacer when a lightning impulse is applied to the gas insulated device.

How to define the position of the conductor connector will be described in greater detail with reference again to FIG. 3A. On the concave surface of the insulator spacer 20, a region g presents an electric field, the strength of which is 70% or more of the strength of the strongest electric field on the surface of the insulator spacer 20 generated by a lightning impulse when applied to the gas insulated device, whereas a region H presents an electric field, the strength of which is 70% or less of the strength of the strongest electric field on the surface of the insulator spacer 20. As is apparent from FIG. 3, the positional relationship between the insulator spacer 20 and the conductor connector 40 is established such that electric flux line X exiting from the end Y of the conductor connector 40 intersects with any point in the region H. Stated another way, the position of the conductor connector 40 is defined such that the electric flux line X exiting from the conductor connector 40 intersects with any point in the region H on the surface of the insulator spacer 20 in which the electric field has the strength equal to or less than 70% of the strength of the strongest electric field on the surface of the insulator spacer 20 which is generated by the applied lightning impulse.

By thus positioning the conductor connector at the location as mentioned above, even if a switching impulse or a direct-current voltage applied to the gas insulated device causes the electrification on the surface of the insulator spacer, the insulation breakdown voltage will not be lowered by the electrification, whereby the gas insulated device will not suffer from insulation breakdown even when a lightning impulse is subsequently applied thereto.

FIG. 1 shows a cross-sectional view of a typical gas insulated device according to a first embodiment of the present invention.

Referring specifically to FIG. 1, a conical insulator spacer 20 is sandwiched between a grounded tank 10 and a grounded tank 11. Also, a conical insulator spacer 21 is sandwiched between the grounded tank 10 and a grounded tank 12. The grounded tanks 10, 11, 12 have an inner diameter of approximately 20 centimeters (cm) to 1 meter (m). A through-type electric conductor 31 extends through and is secured to the insulator spacer 20, while a through-type electric conductor 32 extends through and is secured to the insulator spacer 21. A central electric conductor 30 is secured and electrically connected to the through-type electric conductor 31, 32 via conductor connectors 40, 41. The through-type conductors 31, 32 and the central electric conductor 30 each have a diameter of approximately 15 cm to 24 cm. The central electric conductor 30 has a length of approximately 5 m.

The insulator spacers 20, 21 serve to define the interior space of the grounded tanks 10, 11, 12 and support the through-type electric conductors 31, 32, respectively. The grounded tanks 10, 11, 12 are filled with an insulating gas. Generally, $SF_6$ gas is used as the insulating gas.

The insulating tanks 11, 12 are connected to a gas circuit-breaker or a disconnector, respectively. The grounded tank 11, the conical insulator spacer 20, the through-type electric conductor 31, and a gas circuit-breaker or a disconnector connected thereto are integrally assembled in a factory for convenience of transportation, and carried to a site where they are to be installed with the interior space defined thereby filled with the insulating gas. Similarly, the grounded tank 12, the conical insulating spacer 21, the through-type electric conductor 32, and a gas circuit-breaker or a disconnector connected thereto are integrally assembled in the factory and carried to the installation site with the interior space defined thereby filled with the insulating gas. In addition, at the site, the central electric conductor 30 is mounted via the conductor connectors 40, 41, and enclosed by the grounded tank 10. Then, the interior space defined by the grounded tank 10 and the spacers 20, 21 are filled with the insulating gas. In this way, the installation in the site is facilitated.

The conductor connector 41 has a structure as shown by a cross-sectional view in FIG. 1. Specifically, the conductor connector 41 has a coupler 46 for electrically connecting the through-type electric conductor 32 and the central electric conductor 30. The coupler 46 has a spring-like fastening member 47 embedded therein and has a fastening action toward the radial direction so as to bring the coupler 46 into tight contact with the through-type electric conductor 32 and with the central electric conductor 30. The exterior surface of the coupler 46 is covered with a conductive shield 48. The conductor connector 40 has the same structure as the conductor connector 41.

While there are a variety of structures available for the conductor connectors, they have a longer outer diameter as compared with the through-type electric conductors since they are members for connecting the through-type electric conductors with the central electric conductor. Therefore, the conductor connector, as referred to in this disclosure, is defined to be a connector disposed between a through-type electric conductor extending through and held by an insulator spacer and an electric conductor to be connected with this through-type electric conductor and having an outer diameter longer than that of the through-type electric conductor. Particularly among such conductor connectors, those positioned close to insulator spacers may possibly cause the above-mentioned problem about the electrification on the surface of the insulator spacers.

Embedded electrodes 50, 51 are arranged in flanges of the insulator spacers 20, 21, respectively. The embedded electrodes 50, 51 are provided for preventing insulation breakdown from occurring at a contact formed between the grounded tanks 11, 10 and the flange 22 of the insulator spacer 20 sandwiched therebetween and at a contact formed between the grounded tanks 10, 12 and the flange 23 of the insulator spacer 21 sandwiched therebetween. More specifically, the electric conductors 30, 31, 32 are generally held at a high voltage ranging from 10 kilovolts (kV) to 1000 kV, while the grounded tanks 10, 11, 12 are held at a ground potential, as will be supposed by their names. Therefore, if embedded electrodes were not provided, equi-potential lines would be curved and invade into the flanges 22, 23 of the insulator spacers 20, 21, i.e., between a flange 12 of the grounded tank 11 and a flange 14 of the grounded tank 10 and between a flange 16 of the grounded tank 12 and a flange 15 of the grounded tank 10. This means that an electric field would concentrate on those portions, and accordingly insulation breakdown is more likely to occur. However, since the embedded electrodes 50, 51 are provided and kept at the ground potential, the grounded tanks 10, 11, 12 can be placed at the same potential as the embedded electrodes 50, 51, whereby the equi-potential lines around the through-type electric conductor 31, central electric conductor 30, through-type electric conductor 32, and grounded tanks 11, 10, 12 are substantially parallel. In this way, the embedded electrodes 50, 51 prevent the electric field from concentrating on particular locations. The embedded electrodes 50, 51 have a diameter of approximately 50 mm.

The conductor connectors 40, 41 are positioned such that electric flux lines exiting from the conductor connectors 40, 41 intersect with the surfaces of the insulator spacers 20, 21 in regions in which an electric field has a strength equal to or less than 70% of the strength of the strongest electric field on the surfaces of the insulator spacers 20, 21 generated by a lightning impulse applied to the gas insulated device. More specifically, the conductor connector 40 is positioned such that an end 42 of the conductor connector 40 facing the concave surface of the insulator spacer 20 is located no more than coincidentally with a line drawn prependicularly to the central axis of the electric conductors 30, 31, 32 (indicated by a broken line 44 in FIG. 1) and tangent to a point 52 on the embedded electrode 50 facing a flange surface 24 of the flange 22 of the insulator spacer 20. Also, the conductor connector 41 is positioned such that an end 43 of the conductor connector 41 facing the concave surface of the insulator spacer 21 is located no more than coincidentally with a line drawn perpendicularly to the central axis of the electric conductors 30, 31, 32 (indicated by a broken line 45 in FIG. 1) and tangent to a point 53 on the embedded electrode 51 facing a flange surface 24 of the flange 23 of the insulator spacer 21. In other words, the leftmost position permitted for the conductor connector 40 is determined by the broken line 44 which is coincidental with the end 42 of the conductor connector 40 and tangent to the embedded electrode 50 at the point 52. By arranging the conductor connector 40 at a position on the right side of this position, the electrification on the surface of the insulator spacer 20 does not cause insulation breakdown even if a lightning impulse is applied afterward.

Considering the positional relationship between the right-hand conductor connector 41 and the embedded electrode 51, the rightmost position permitted for the conductor connector 41 is determined by the broken line 45 which is coincidental with the end 43 of the conductor connector 41 and tangent to the embedded electrode 51 at a point 53. By arranging the conductor connector 41 at a position on the left side of this position, the electrification on the surface of the insulator spacer 21 does not cause insulation breakdown even if a lightning impulse is applied afterward.

The positioning of the conductor connectors will be further explained with reference to experiment data shown in FIG. 2.

Figure 2:
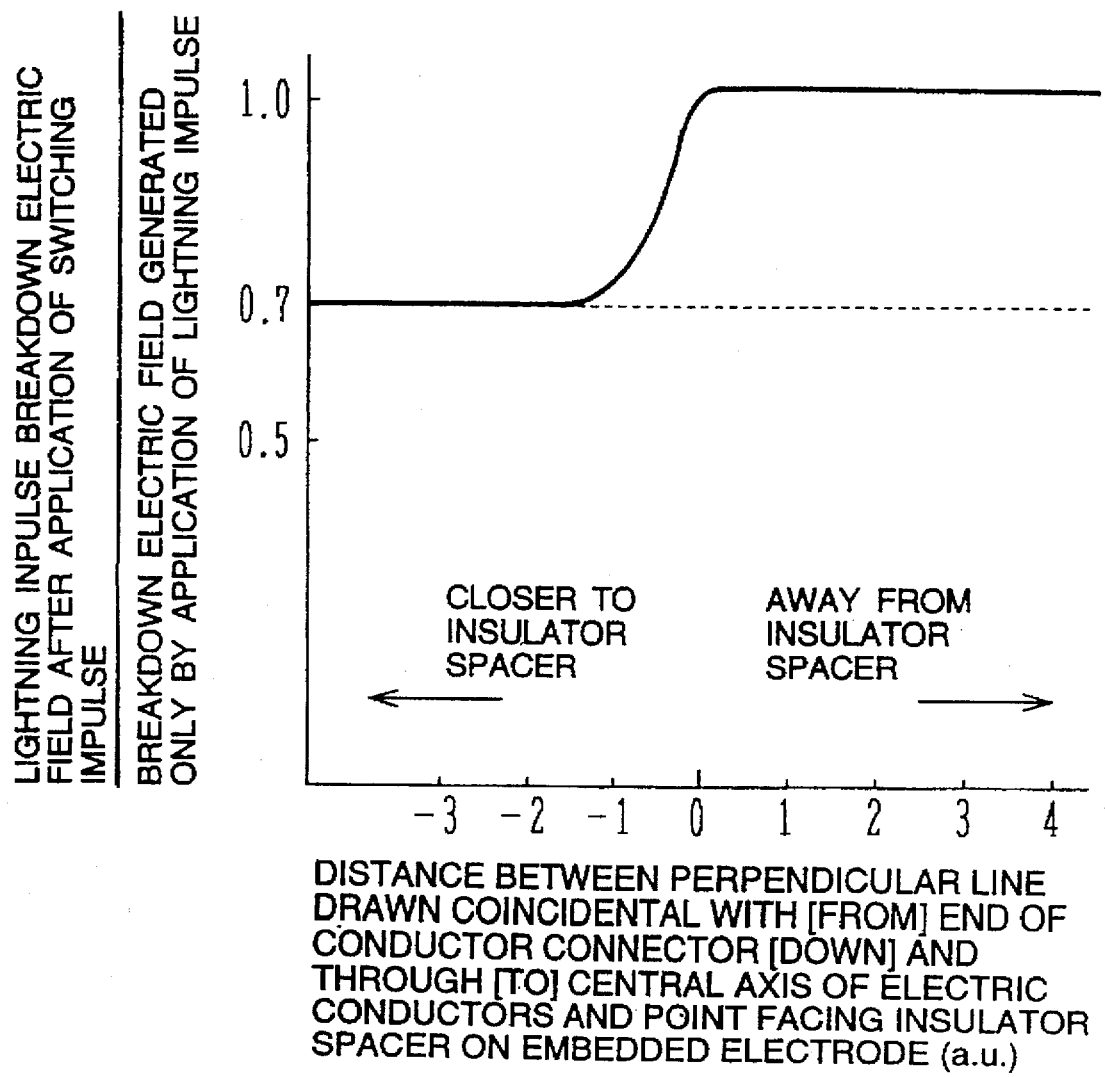
FIG. 2 is a graph representing the relationship between the position of a conductor connector and the lightning impulse insulation breakdown performance after a switching impulse has been applied.

Referring specifically to a graph of FIG. 2, the abscissa axis represents the distance between a perpendicular line drawn coincidentally with the end 42 of the conductor connector 49 through the central axis of the electric conductor 31 and tangent to the point 52 on the embedded electrode 50 in the insulator spacer 20. The point 52 is opposite to the flange surface 24 of the insulator spacer 20. The "0" point on the abscissa axis corresponds to the broken line 44 which is coincidental with the end 42 of the conductor connector 40 and tangent to the point 42 on the embedded electrode 50. In the minus region beyond the "0" point, the conductor connector 40 is closer to the insulator spacer 20, while in the plus region beyond the "0" point, the conductor connector 40 is more spaced from the insulator spacer 20. The ordinate axis represents a relative value of a breakdown electric field, generated when a lightning impulse is applied after a switching impulse has been applied, to a breakdown electric field generated when a lightning impulse only is applied. The relative value at 1.0 indicates that the breakdown electric field does not change when the lightning impulse only is applied and when the lightning impulse is applied after the switching impulse has been applied, i,e, that the breakdown electric field is not influenced by the electrification caused by the applied switching impulse.

As is apparent from the graph of FIG. 2, at the "0" point on the abscissa axis, i.e., in the state where the broken line 44 is coincidental with the end 42 of the conductor connector 40 and tangent the point 52 of the embedded electrode 50 as shown in FIG. 1, the breakdown electric field is not influenced by the applied switching impulse. It is also apparent that the breakdown electric field is not influenced by the applied switching impulse in the plus region beyond the "0" point, i.e., in a state where the conductor connector 40 is more spaced from the insulator spacer 20.

On the other hand, in the minus region beyond the "0" point, i.e., in a state where the conductor connector 40 is closer to the insulator spacer 20, the relative value on the ordinate axis gradually decreases and finally reaches 0.7. This indicates that when a lightning impulse is applied after a switching impulse has been applied, the breakdown will be caused by approximately 70% of the breakdown electric field generated when the lightning impulse only is applied, due to the influence of the an electric field generated by the electrification caused by the applied switching impulse, where a saturated value of the electric field generated by the electrification corresponds to approximately 30% of the breakdown electric field generated when the lightning impulse only is applied.

As described above, according to the present invention, the conductor connector 40 is positioned such that a perpendicular line drawn coincidental with an end 42 of the conductor connector 40 facing the concave surface of the insulator spacer 20 and through the central axis of the electric conductors 30, 31, 32 (indicated by a broken line 44 in FIG. 1) does not approach the concave surface of the insulator spacer 20 beyond a point 52 facing a flange surface 24 on the embedded electrode 50 in the flange 22 of the insulator spacer 20. Also, the conductor connector 41 is positioned such that a perpendicular line drawn coincidental with an end 43 of the conductor connector 41 facing the concave surface of the insulator spacer 21 and through the central axis of the electric conductors 30, 31, 32 (indicated by a broken line 45 in FIG. 1) does not approach the concave surface of the insulator spacer 21 beyond a point 53 facing a flange surface 24 on the embedded electrode 51 in the flange 23 of the insulator spacer 21. It is therefore possible to control the influence of charges accumulated on the surfaces of the insulator spacers 20, 21 due to the applied switching impulse, so that the gas insulated device does not suffer from a deteriorated insulation breakdown performance when a lightning impulse is applied.

While the explanation with reference to FIG. 2 has been made on the influence of the lightning impulse, applied after the switching pulse has been applied, on the breakdown electric field, the same explanation may be applied to discuss the influence of a lightning impulse, applied after a direct-current voltage has been applied, on the breakdown electric field in a section of an electric conductor which is electrically isolated by a disconnector and in which a direct-current voltage remains.

Also, in a gas insulated device actually installed in a field, since charges are accumulated, the gas insulated device may be influenced by a switching impulse as well as a direct-current voltage applied thereto. Even if the switching impulse and the direct-current voltage are both applied to the gas insulated device, a saturated value of an electric field due to the charges accumulated on the surfaces of insulator spacers is at most 30% of the breakdown electric field generated when a lightning impulse is applied. It is therefore possible to prevent the insulation breakdown from occurring when a lightning impulse is applied, provided that the positional relationship between the conductor connectors and the embedded electrodes is followed, as described with reference to FIGS. 1, 2.

Figure 4:
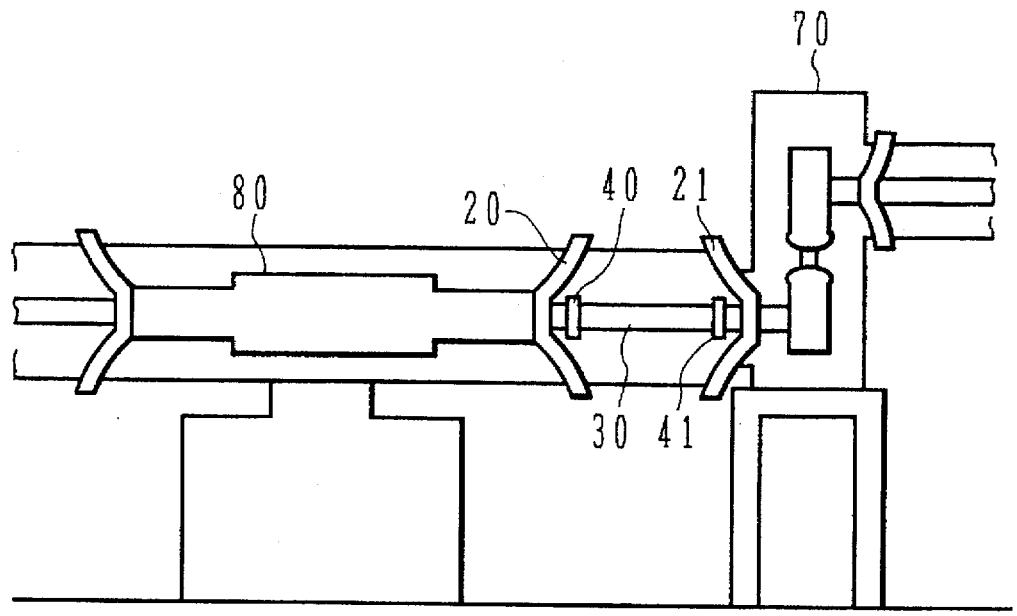
FIG. 4 is a cross-sectional view showing another embodiment of a gas insulated switchgear to which the present invention is applied.

Next, another embodiment of the present invention will be described with reference to FIG. 4. FIG. 4 shows an example of a gas insulated switchgear in which a gas insulated device having conductor connectors arranged at positions satisfying the above defined conditions is used between a circuit-breaker 80 and a disconnector 70.

The gas insulated device unit is structured such that an electric conductor 30 is supported by insulator spacers 20, 21 via conductor connectors 40, 41. The conductor connectors 40, 41 are arranged at the positions relative to the insulator spacers 20, 21 as defined in the description made in connection with FIG. 1.

If an accident occurs, the circuit-breaker 80 must break a current to facilities connected thereto, and the circuit-breaker 80 and associated components must be tested after the current is broken. For this purpose, the power supply must be turned off by the disconnector 70.

Thus, according to this embodiment, it is possible to prevent the reliability of the gas insulated switchgear for insulation from deterioration due to a switching impulse which is generated when the circuit-breaker or the disconnector operates.

Also, although the gas insulated device is a section which is electrically isolated by the circuit-breaker and in which a direct-current voltage remains, the gas insulated device can be prevented from the influence of the electrification on the surfaces of insulator spacers due to the direct-current voltage, as is the case where a switching impulse is applied thereto, thereby improving the reliability of the gas insulated switchgear for insulation.

Figure 5:
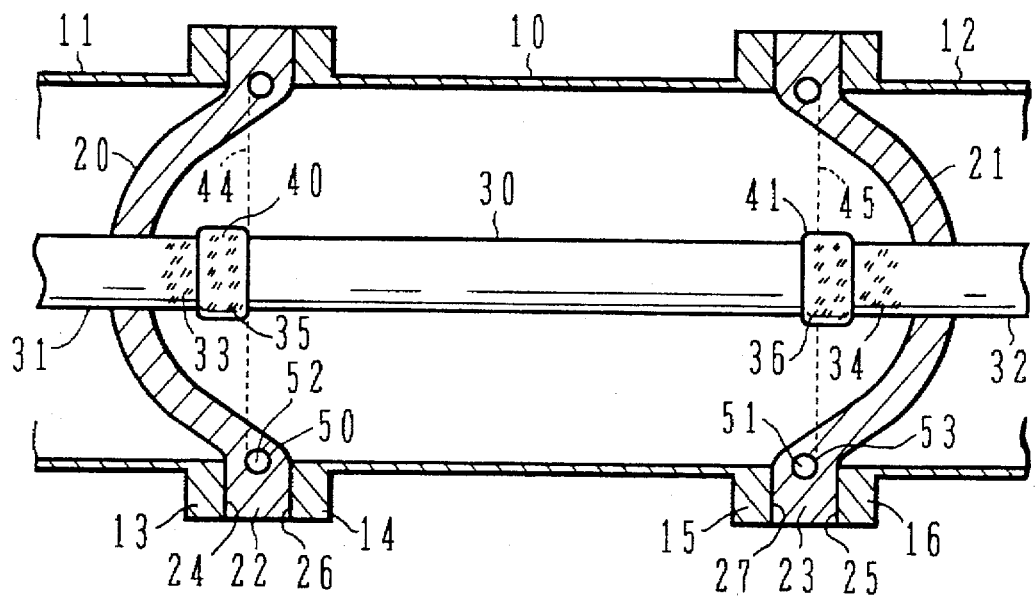
FIG. 5 is a cross-sectional view of a gas insulated device according to a third embodiment of the present invention.

Similar effects can also be produced when the section having the structure described with reference to FIG. 1 or 5 is provided in a gas insulated device installed between a cable of a cable direct-coupled gas insulated switchgear GIS and the first disconnector connected to this cable, or on a gas insulated bus line GIL.

Next, a third embodiment of the present invention will be described with reference to FIGS. 5, 6.

In FIG. 5, components identical to those in FIG. 1 are designated the same reference numerals.

The third embodiment differs from the foregoing embodiments shown in FIG. 1 in that conductor connectors or electric conductors connected thereto are considered for the influence of the electrification on the insulator spacers, instead of the positions of the conductor connectors relative to the insulator spacers. Specifically, as is apparent from the foregoing description, an electric field on an insulator spacer is influenced by charges accumulated on the surface of the insulator spacer. It is therefore possible to reduce such influence by preventing electrons from exiting from the electric conductors or from the conductor connectors.

In the example shown in FIG. 5, portions of the electric conductors or the conductor connectors possibly causing the electrification on the insulator spacers are subjected to a surface treatment. This surface treatment will be first explained with reference to experiment data shown in FIG. 6.

Figure 6:
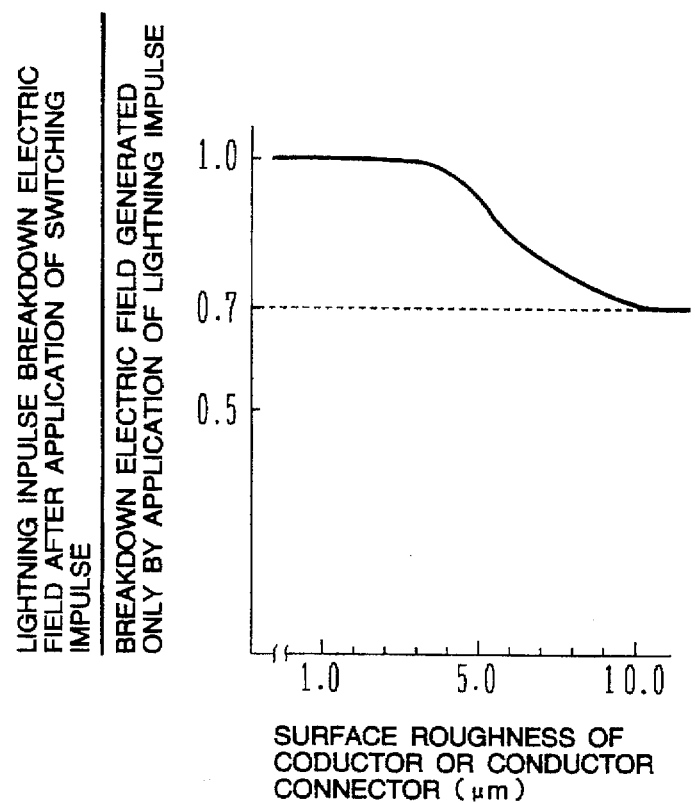
FIG. 6 is a graph representing the relationship between a conductor surface treatment and the lightning impulse insulation breakdown performance after a switching impulse has been applied.

FIG. 6 shows the relationship between a surface roughness on a conductor obtained as a result of the surface treatment and a relative value of a breakdown electric field, generated when a lightning impulse is applied after a switching impulse has been applied, to a breakdown electric field when a lightning impulse only is applied.

The surface of the insulator spacer is electrified by electrons emitted from the surface of the electric conductor and charges produced by the electrons which accumulate on the surface of the insulator spacer. Thus, by treating the surface of the conductor so as to prevent electrons from being emitted therefrom, the electrification on the surface of the insulator spacer can be reduced to prevent the insulation breakdown.

Figure 8:
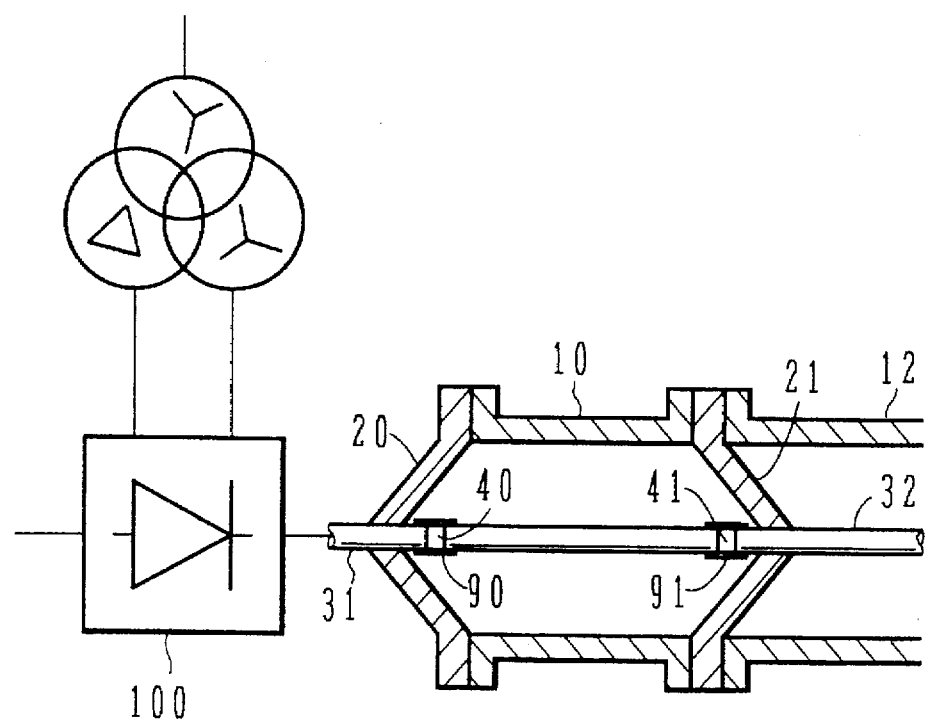
FIG. 8 is a diagram showing a fifth embodiment of the present invention when applied to a gas insulated bus line.

More specifically, as shown in FIG. 8, when the surface roughness of the electric conductor or the conductor connector is 4.5 μm or less, an electric field on the insulator spacer is substantially free from the influence of an applied switching impulse. This is because the surface of the conductor or the conductor connector, treated to have a smaller surface roughness, results in a reduction in electrons emitted therefrom, thus preventing the production of charges which result in the electrification on the surface of the insulator spacer.

Turning back to FIG. 5, in the third embodiment, the surface roughness of the electric conductors is reduced to 4.5 μm or less, as an example of the surface treatment.

In FIG. 5, components identical to those in FIG. 1 are designated the same reference numerals. In the third embodiment, the surface treatment is carried out on portions of the surfaces of through-type electric conductors 31, 32, conductor connectors 40, 41, and a central electric conductor 30, from which electric flux lines exit and intersect with regions on the surfaces of insulator spacers 20, 21 in which an electric field has a strength equal to or less than 70% of the strength of the strongest electric field on the surfaces of the insulator spacers 20, 21 that is generated by a lightning impulse applied to the gas insulated device. Specifically, surface portions 33, 34 of the through-type electric conductors 31, 32 and surface portions 35, 36 of the conductor connectors 40, 41, all of which face the concave surfaces of the insulator spacers 20, 21, are subjected to the surface treatment. More specifically, the surface portions 33, 34 of the through-type electric conductors 31, 32 and the surface portions 35, 36 of the conductor connectors 40, 41 are mirror polished to have a surface roughness equal to 4.0 μm which is lower than 4.5 μm.

According to the third embodiment, the surface portions of conductors positioned closest to the insulator spacers are treated to have a surface roughness equal to or less than 4.5 μm to prevent the production of charges. It is therefore possible to prevent the influence of charges accumulated on the surfaces of the insulator spacers due to the applied switching impulse, so that the gas insulated device does not suffer from a deteriorated insulation breakdown performance due to the accumulated charges, when a lightning impulse is applied.

It is also possible to prevent the influence of charges accumulated on the surfaces of the insulator spacers due to a direct-current voltage applied to the gas insulated device, so that the gas insulated device does not suffer from a deteriorated insulation breakdown performance due to the accumulated charges, when a lightning impulse is applied.

A further advantage of the third embodiment is that, as shown in FIG. 5, the conductor connectors can be positioned closer to the insulator spacers, as compared with the structure shown in FIG. 1.

It should be noted that while in the third embodiment, the central electric conductor 30 is not surface treated, it is also necessary to surface treat portions, if any, of the surface of the central electric conductor 30 from which electric flux lines exit and intersect with regions on the surfaces of insulator spacers 20, 21 in which an electric field has a strength equal to or less than 70% of the strength of the strongest electric field on the surfaces of the insulator spacers 20, 21 generated by a lightning impulse applied to the gas insulated device.

If the conductor connectors 40, 41 are positioned in a spaced relationship with the insulator spacers 20, 21, the mirror polishing may be carried out only on portions of the surfaces of the through-type electric conductors 31, 32 facing the concave surfaces of the insulator spacers 20, 21.

Next, a third embodiment of the present invention will be described with reference to FIG. 7.

Figure 7:
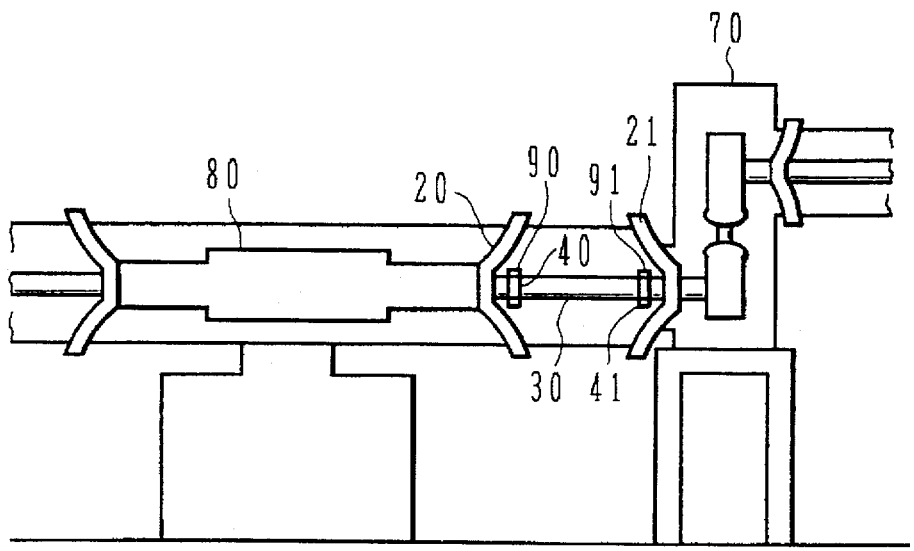
FIG. 7 is a cross sectional view showing a fourth embodiment of the present invention when installed between a circuit-breaker and a disconnector in a gas insulated switchgear.

The embodiment shown in FIG. 7 is a gas insulated switchgear GIS in which a gas insulated device having the structure described above is arranged between a circuit-breaker 80 and a disconnector 70. More specifically, the gas insulated device is structured such that an electric conductor 30 is supported by insulator spacers 20, 21 via conductor connectors 40, 41, where an insulation coating, as a surface treatment, is deposited on surface portions 90, 91 of the conductor connectors of both ends of the electric conductor 30 from which electric flux lines exit and intersect with regions on the surfaces of insulator spacers 20, 21 in which an electric field has a strength equal to or more than 70% of the strength of the strongest electric field on the surfaces of the insulator spacers 20, 21 generated by a lightning impulse applied to the gas insulated device. For the insulation coating, an epoxy insulation coating material is deposited on the required surface portions in a thickness ranging from 30 μm to 200 μm. Regions requiring the insulation coating may include the surfaces of through-type electric conductors extending through the insulator spacers 20, 21 and the surfaces of the conductor connectors.

Alternatively, the portions requiring the insulation coating may be surface treated to have a surface roughness of 4.5 μm or less.

When the gas insulated device of the structure described above is arranged between the circuit-breaker 80 and the disconnector 70, in which a direct-current voltage may remain, it is possible to improve the reliability of the gas insulated switchgear for insulation, when the circuit breaker 80 or the disconnector 70 is again turned on, thus suppressing an increased cost of the gas insulated switchgear.

FIG. 8 shows a fifth embodiment of the present invention, where surface treated conductors as described above are used in a gas insulated bus line (GIL).

A voltage from an alternate-current power transmission network is transformed to a direct-current voltage by a thyristor valve 100 which in turn is connected to a through-type electric conductor 31. A grounded tank 10 supports insulator spacers 20, 21, and another grounded tank 12 is also provided. An epoxy insulation coating in a thickness of 30 μm to 200 μm is deposited on portions of through-type electric conductors 31, 32 extending through the insulator spacers 20, 21 near the insulator spacers 20, 21 and on surface portions 90, 91 of conductor connectors 40, 41. While the thyristor 100 delivers a direct-current output, the influence of the electrification possibly caused by this direct-current voltage can be removed by the insulation coating. Instead of the insulation coating, portions requiring the insulation coating may be surface treated to have a surface roughness of 4.5 μm or less.

According to the fifth embodiment, it is therefore possible to prevent the influence of charges accumulated on the surfaces of the insulator spacers due to an applied switching impulse or remaining direct-current voltage, so that the GIL does not suffer from a deteriorated insulation breakdown performance due to the accumulated charges, when a lightning impulse is applied.

Figure 9:
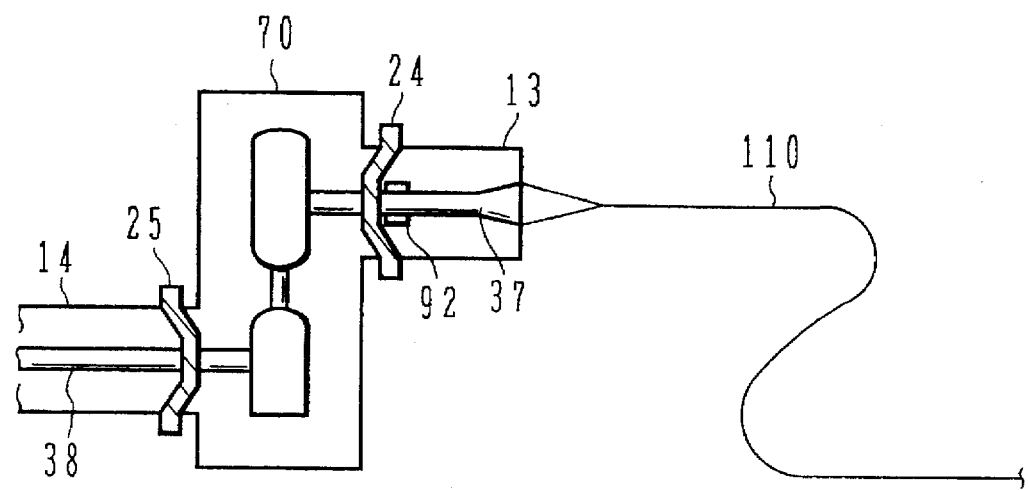
FIG. 9 is a diagram showing a sixth embodiment of the present invention when applied to a cable direct-coupled gas insulated switchgear.

FIG. 9 shows a fifth embodiment of the present invention, where a gas insulated device using conductors treated as described above is arranged in a section between a cable 110 of a cable direct-coupled GIS and the first disconnector 70 connected to this cable 110. More specifically, an insulator spacer 24 is arranged in a grounded tank 13 between the cable 110 and one end of the disconnector 70. An electric conductor 37 extending through the insulator spacer 24 is connected to the cable 110. A portion 92 of the electric conductor 37 near the insulator spacer 24 is covered with an insulation coating.

The other end of the disconnector 70 is connected to a grounded tank 14 in which an insulator spacer 25 is held, and an electric conductor 38 extends through the insulator spacer 25. Instead of the insulation coating, the surface of the electric conductor 37 may be treated to have a surface roughness of 4.5 μm or less.

According to the sixth embodiment, it is possible to prevent the insulation breakdown performance of the insulator spacers from being deteriorated due to a switching impulse which is generated when the disconnector 70 operates.

Figure 10:
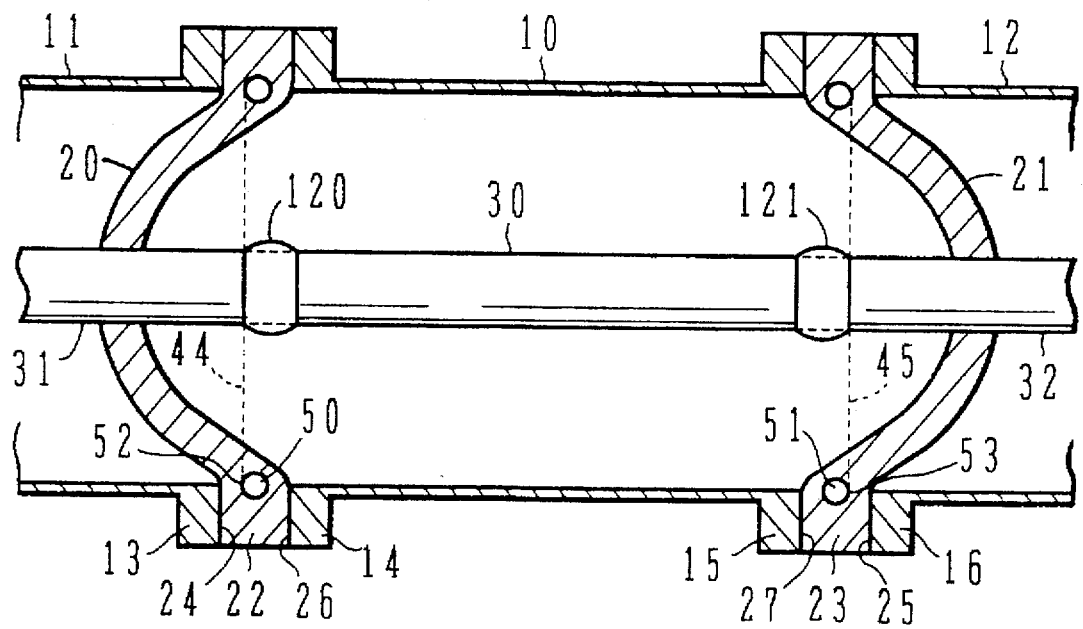
FIG. 10 is a cross-sectional view of a gas insulated device according to a seventh embodiment of the present invention.

FIG. 10 shows an sixth embodiment of the present invention. The embodiment shown in FIG. 10 differs from the embodiment shown in FIG. 1 in that a single electric conductor 30 only is supported by insulator spacers 20, 21. Shields 120, 121 are deposited on the electric conductor 30 for weakening an electric field. A region in which the insulator spacers 20, 21, the grounded tank 10, and an insulating gas are brought into contact is called a "triple median point" which is a region in which an insulator, an electric conductor, and a gas exist together in contact with each other. The shields 120, 121 may often be provided for weakening an electric field particularly in this region. However, the shields 120, 121 also cause the electrification on the insulator spacers 20, 21 to lead to a deteriorated insulation breakdown performance of the insulator spacers.

To cope with the problem of the deteriorated insulation break-down performance due to the shields, the gas insulated device according to the seventh embodiment has the following structure. The conical insulator spacer 20 is arranged between a grounded tank 10 and a grounded tank 11, while the conical insulator spacer 21 is arranged between the grounded tank 10 and a grounded tank 12. The grounded tanks 10, 11, 12 have an inner diameter approximately ranging from 20 cm to 1 m. The electric conductor 30, having a diameter ranging approximately from 15 cm to 24 cm, is securely supported by the insulator spacers 20, 21. The shields 120, 121 on the electric conductor 30 serve to weaken an electric field around the electric conductor 30.

The insulator spacers 20, 21 serve to divide an interior space defined by the grounded tanks 10, 11, 12 and to support the electric conductor 30. The inside of the grounded tanks 10, 11, 12 is filled with an insulating gas for which a $SF_6$ gas may be generally employed. The grounded tanks 11, 12 are connected to a gas insulated circuit-breaker and a disconnector, respectively.

Embedded electrodes 50, 51 are arranged in flanges 22, 23 of the insulator spacers 20, 21, respectively. The embedded electrodes 50, 51 are provided for preventing insulation breakdown from occurring at a contact formed between the grounded tanks 11, 10 and the flange 22 of the insulator spacer 20 sandwiched therebetween and at a contact formed between the grounded tanks 10, 12 and the flange 23 of the insulator spacer 21 sandwiched therebetween. More specifically, the electric conductor 30 is generally held at a high voltage ranging from 10 kilovolts (kV) to 1000 kV, while the grounded tanks 10, 11, 12 are held at a ground potential, as will be supposed by their names. Therefore, if embedded electrodes were not provided, equi-potential lines would be curved and invade into the flanges 22, 23 of the insulator spacers 20, 21, i.e., between a flange 13 of the grounded tank 11 and a flange 14 of the grounded tank 10 and between a flange 16 of the grounded tank 12 and a flange 15 of the grounded tank 10. This means that an electric field would concentrate on those portions, and accordingly insulation breakdown is more likely to occur. However, since the embedded electrodes 50, 51 are provided and kept at the ground potential, the grounded tanks 10, 11, 12 can be placed at the same potential as the embedded electrodes 50, 51, whereby the equi-potential lines around the central electric conductor 30 and the grounded tanks 11, 10, 12 are substantially parallel. In this way, the embedded electrodes 50, 51 prevent the electric field from concentrating on particular locations. The embedded electrodes 50, 51 have a diameter of approximately 50 mm.

The shields 120, 121 are positioned such that electric flux lines exiting from the shields 120, 121 intersect with the surfaces of the insulator spacers 20, 21 in regions where an electric field has a strength equal to or less than 70% of the strength of the strongest electric field on the surfaces of the insulator spacers 20, 21 which is generated by a lightning impulse applied to the gas insulated device. More specifically, the shield 120 is positioned such that a line passing the left side of the shield 120 facing the concave surface of the insulator spacer 20 and perpendicularly to the central axis of the electric conductor 30 (a broken line 44 in FIG. 10) does not approach the concave surface of the insulator spacer 20 beyond a point 52 facing a flange surface 24 on the embedded electrode 50 in the flange 22 of the insulator spacer 20. Likewise, the shield 121 is positioned such that a line passing the right side of the shield 121 facing the concave surface of the insulator spacer 21 and perpendicularly to the central axis of the electric conductor 30 (a broken line 45 in FIG. 10) does not approach the concave surface of the insulator spacer 21 beyond a point 53 facing a flange surface 25 on the embedded electrode 51 in the flange 23 of the insulator spacer 21. In other words, the leftmost position permitted for the shield 120 is determined by the broken line 44 which is coincidental with the left-side of the shield 120 and tangent to the embedded electrode 50 at the point 52. By arranging the shield 120 at a position on the right side of this position, the electrification on the surface of the insulator spacer 20 would not cause insulation breakdown even if a lightning impulse is applied afterward.

Considering similarly the positional relationship between the right-hand shield 121 and the embedded electrode 51, the rightmost position permitted for the shield 121 is determined by the broken line 45 which is coincidental with the right-side of the shield 121 and tangent to the embedded electrode 51 at a point 53. By arranging the shield 121 at a position on the left side of this position, the electrification on the surface of the insulator spacer 21 would not cause insulation breakdown even if a lightning impulse is applied afterward.

generally, the electric conductor 30 provided with the shields 120, 121 is arranged in hollow grounded tanks, however, some mechanical parts may also be contained in the inside space of the grounded tanks. It is intended that this embodiment includes both cases.

According to the seventh embodiment, the gas insulated device will not suffer from a deteriorated insulation breakdown performance of the insulator spacers when a lightning impulse or a direct-current voltage is applied, even if shields for weakening an electric field are used.

It will be appreciated from the foregoing description that the respective embodiments of the present invention suppress the electrification on the surfaces of insulator spacers of a gas insulated device which would deteriorate the insulation breakdown performance thereof and accordingly prevent insulation breakdown when a lightning impulse or a direct-current voltage is applied to the gas insulated device. It is therefore possible to improve the reliability of the gas insulated device for insulation as well as to reduce the size and weight of the gas insulated device.

According to the present invention, even if the surfaces of insulator spacers are electrified due to a switching impulse or a direct current voltage applied to a gas insulated device, the insulation breakdown will not be caused by a lightning impulse which may be applied to the gas insulated device at later time.

Also, according to the present invention, a gas insulated switchgear will not experience a deteriorated insulation breakdown performance even after a circuit-breaker or a disconnector has operated.

Further, according to the present invention, a gas insulated bus line will not experience a deteriorated insulation breakdown performance even after a switching impulse or a direct-current voltage is applied thereto.

Furthermore, according to the present invention, a cable direct-coupled gas insulated switchgear will not experience a deteriorated insulation breakdown performance even after a circuit-breaker has operated.

We claim:

1. A gas insulated device comprising:
a grounded tank filled with an insulating gas;
a conical insulator spacer securely mounted in said grounded tank and defining an interior space of said grounded tank;
a through-type electric conductor extending through and supported by said insulator spacer;
an electric conductor electrically connected to said through-type electric conductor; and
a conductor connector for electrically connecting said electric conductor with said through-type electric conductor and for supporting said electric conductor,
wherein the conductor connector is positioned closest to said insulator spacer such that electric flux lines exiting from said conductor connector intersect with the surface of said insulator spacer in a region in which an electric field has a strength equal to or less than 70% of the strength of the strongest electric field on the surface of said insulator spacer generated by a lightning impulse applied to said gas insulated device.

2. A gas insulated device comprising:
a grounded tank filled with an insulating gas;
a conical insulator spacer securely mounted in said grounded tank and defining an interior space of said grounded tank;
a through-type electric conductor extending through and supported by said insulator spacer;
an electric conductor electrically connected to said through-type electric conductor;
a conductor connector for electrically connecting said electric conductor with said through-type electric conductors and for supporting said electric conductor; and
an embedded electrode embedded in a flange of said insulator spacer,
wherein the conductor connector is positioned closest to said insulator spacer such that a line drawn coincidental with an end of said conductor connector facing a concave surface of said insulator spacer and perpendicular to a central axis of said electric conductor does not approach the concave surface of said insulator spacer beyond said embedded electrode in the flange of said insulator spacer.

3. A gas insulated device comprising:
a grounded tank filled with an insulating gas;
a conical insulator spacer securely mounted in said grounded tank and defining an interior space of said grounded tank;
a through-type electric conductor extending through and supported by said insulator spacer;
an electric conductor electrically connected to said through-type electric conductor; and
a conductor connector for electrically connecting said electric conductor with said through-type electric conductor and for supporting said electric conductor,
wherein a surface treatment is performed on a portion of surface of at least one of said electric conductor and said conductor connector from which electric flux lines exit and intersect with the surface of said insulator spacer in a region in which an electric field has a strength equal to or more than 70% of the strength of the strongest electric field on the surface of said insulator spacer generated by a lightning impulse applied to said gas insulated device.

4. A gas insulated device according to claim 3, wherein said surface treatment includes an insulation coating deposited on said portion of the surface of at least one of said electric conductor and said conductor connector.

5. A gas insulated device according to claim 4, wherein said insulation coating is formed by an epoxy insulation coating material and is deposited on said portion in a thickness ranging from 30 μm to 200 μm.

6. A gas insulated device according to claim 3, wherein said surface treatment is performed such that said portion of the surface of at least one of said electric conductor and said conductor connector has a surface roughness equal to or less than 4.5 μm.

7. A gas insulated switchgear comprising a circuit-breaker, a disconnector, and a gas insulated device for connecting said circuit-breaker with said disconnector, said gas insulated device including a grounded tank filled with an insulating gas, a conical insulator spacer securely mounted in said grounded tank and defining an interior space of said grounded tank, a through-type electric conductor extending through and supported by said insulator spacer, an electric conductor electrically connected to said through-type electric conductor, and a conductor connector for electrically connecting said electric conductor with said through-type electric conductor and for supporting said electric conductor, wherein the conductor connector is position closest to said insulator spacer such that electric flux lines exiting from said conductor connector intersect with the surface of said insulator spacer in a region in which an electric field has a strength equal to or less than 70% of the strength of the strongest electric field on the surface of said insulator spacer generated by a lightning impulse applied to said associated gas insulated device.

8. A gas insulated switchgear comprising a circuit-breaker, a disconnector, and a gas insulated device for connecting said circuit-breaker with said disconnector, said gas insulated device including a grounded tank filled with an insulating gas, a conical insulator spacer securely mounted in said grounded tank and defining an interior space of said grounded tank, a through-type electric conductor extending through and supported by said insulator spacer, an electric conductor electrically connected to said through-type electric conductor, a conductor connector for electrically connecting said electric conductor with said through-type electric conductor and for supporting said electric conductor, and an embedded electrode embedded in a flange of said insulator spacer, wherein the conductor connector is positioned closest to said insulator spacer such that a line drawn coincidental with an end of said conductor connector facing a concave surface of said insulator spacer and perpendicular to a central axis of said electric conductor does not approach the concave surface of said insulator spacer beyond said embedded electrode in the flange of said insulator spacer.

9. A gas insulated switchgear comprising a circuit-breaker, a disconnector, and a gas insulated device for connecting said circuit-breaker with said disconnector, said gas insulated device including a grounded tank filled with an insulating gas, a conical insulator spacer securely mounted in said grounded tank and defining an interior space of said grounded tank, a through-type electric conductor extending through and supported by said insulator spacer, an electric conductor electrically connected to said through-type electric conductor, and a conductor connector for electrically connecting said electric conductor with said through-type electric conductor and for supporting said electric conductor, wherein a surface treatment is performed on a portion of surface of at least one of said electric conductor and said conductor connector from which electric flux lines exit and intersect with the surface of said insulator spacer in a region in which an electric field has a strength equal to or more than 70% of the strength of the strongest electric field on the surface of said insulator spacer generated by a lightning impulse applied to said associated gas insulated device.

10. A gas insulated bus line comprising:

a grounded tank filled with an insulating gas;

a conical insulator spacer securely mounted in said grounded tank and defining an interior space of said grounded tank; and a through-type electric conductor extending through and supported by said insulator spacer;

wherein a surface treatment is performed on a portion of surface of at least one of said through-type electric conductor and said conductor connector from which electric flux lines exit and intersect with the surface of said insulator spacer in a region in which an electric field has a strength equal to or more than 70% of the strength of the strongest electric field on the surface of said insulator spacer generated by a lightning impulse applied to said gas insulated device.

11. A cable direct-coupled gas insulated switchgear comprising a cable, a disconnector, and a gas insulated device for connecting said cable with said disconnector, said gas insulated device including a grounded tank filled with an insulating gas, a conical insulator spacer securely mounted in said grounded tank and defining an interior space of said grounded tank, a through-type electric conductor extending through and supported by said insulator spacer, an electric conductor electrically connected to said through-type electric conductor, and a conductor connector for electrically connecting said electric conductor with said through-type electric conductor and for supporting said electric conductor, wherein a surface treatment is performed on portions of surfaces of at least one of said electric conductor and said conductor connector from which electric flux lines exit and intersect with the surfaces of said insulator spacer in a region in which an electric field has a strength equal to or more than 70% of the strength of the strongest electric field on the surface of said insulator spacer generated by a lightning impulse applied to said gas insulated device.

12. A gas insulated device comprising:

a grounded tank filled with an insulating gas;

a conical insulator spacer securely mounted in said grounded tank and defining an interior space of said grounded tank;

an electric conductor extending through and supported by said insulator spacer; and a shield member for covering part of the outer peripheral surface of said electric conductor, wherein said shield member is positioned closest to said insulator spacer such that electric flux lines exiting from said shield member intersect with the surface of said insulator spacer in a region in which an electric field has a strength equal to or less than 70% of the strength of the strongest electric field on the surface of said insulator spacer generated by a lightning impulse applied to said associated gas insulated device.

* * * * *